US011595439B2

(12) United States Patent
Moeck et al.

(10) Patent No.: US 11,595,439 B2
(45) Date of Patent: Feb. 28, 2023

(54) NETWORK DEVICE DETECTION AND VERIFICATION PROTOCOL

(71) Applicant: SPINS VENTURES LLC, Chicago, IL (US)

(72) Inventors: Andrew Michael Moeck, Huntington Beach, CA (US); Hans J. Theisen, Chicago, IL (US)

(73) Assignee: Spins Ventures LLC, Chicago, IL (US)

( * ) Notice: Subject to any disclaimer, the term of this patent is extended or adjusted under 35 U.S.C. 154(b) by 0 days.

(21) Appl. No.: 17/745,199

(22) Filed: May 16, 2022

(65) Prior Publication Data

US 2022/0279016 A1 Sep. 1, 2022

Related U.S. Application Data

(63) Continuation of application No. 16/230,639, filed on Dec. 21, 2018, now Pat. No. 11,349,869.

(Continued)

(51) Int. Cl.
*H04L 9/40* (2022.01)
*H04L 67/306* (2022.01)
*H04L 67/10* (2022.01)
*H04W 76/11* (2018.01)
*H04W 12/122* (2021.01)
*H04L 67/53* (2022.01)

(52) U.S. Cl.
CPC ........ *H04L 63/1483* (2013.01); *H04L 63/102* (2013.01); *H04L 63/1416* (2013.01); *H04L 67/10* (2013.01); *H04L 67/306* (2013.01); *H04L 67/53* (2022.05); *H04W 12/122* (2021.01); *H04W 76/11* (2018.02)

(58) Field of Classification Search
CPC .............. H04L 63/1483; H04L 63/102; H04L 63/1416; H04L 67/10; H04L 67/306; H04L 67/53; H04W 12/122; H04W 76/11; H04W 12/69
See application file for complete search history.

(56) References Cited

U.S. PATENT DOCUMENTS 8,984,604 B2 * 3/2015 Begley ................... H04L 67/02
  726/7
9,674,145 B2 * 6/2017 Chien ................ H04L 63/0245
(Continued)

OTHER PUBLICATIONS

Liu et al., TraffickStop: Detecting and Measuring Illicit Traffic Monetization Through Large-scale DNS Analysis, 2019 EEE European Symposium on Security and Privacy, 2019, pp. 560-575.

*Primary Examiner* — Ramy M Osman
(74) *Attorney, Agent, or Firm* — Quarles & Brady LLP (57) ABSTRACT

Certain embodiments of this disclosure describe techniques for detecting a spoofed network device and preventing the serving of content, such as advertisements, to the spoofed network device. In certain embodiments, a network security system is provided. The network security system can include hardware and/or software programmed to prevent the provision of content to a spoofed client device. The network security system can provide a mechanism for certifying to content providers, such as advertisers, whether or not a client is a legitimate mobile device or a spoofed device. Accordingly, content providers can prevent the delivery of content to fraudulent devices instead of relying on imprecise solutions that detect fraudulent activity after it has occurred.

15 Claims, 6 Drawing Sheets

Related U.S. Application Data (60) Provisional application No. 62/609,789, filed on Dec. 22, 2017.

(56) References Cited

U.S. PATENT DOCUMENTS

| | | | |
|---|---|---|---|
| 9,906,511 B1* | 2/2018 | Koi | H04L 9/3242 |
| 10,674,009 B1* | 6/2020 | Jakobsson | H04M 3/382 |
| 11,349,869 B1* | 5/2022 | Moeck | H04L 67/10 |
| 2002/0091642 A1 | 7/2002 | Rahnasto | |
| 2004/0250082 A1* | 12/2004 | Li | H04L 9/3247 713/181 |
| 2005/0278542 A1* | 12/2005 | Pierson | H04L 63/0876 713/182 |
| 2006/0156389 A1* | 7/2006 | Brown | H04L 63/1408 726/1 |
| 2012/0173315 A1 | 7/2012 | Martini et al. | |
| 2013/0061053 A1 | 3/2013 | Yamaguchi et al. | |
| 2014/0067494 A1* | 3/2014 | Squires | G06Q 30/0207 705/14.1 |
| 2014/0189829 A1* | 7/2014 | McLachlan | G06Q 20/4014 726/6 |
| 2015/0195268 A1 | 7/2015 | Fang | |
| 2016/0105702 A1 | 4/2016 | Pasko | |
| 2016/0210450 A1* | 7/2016 | Su | H04L 63/10 |
| 2016/0330236 A1* | 11/2016 | Reddy | H04L 63/1416 |
| 2017/0032412 A1 | 2/2017 | Scharber et al. | |
| 2017/0070534 A1* | 3/2017 | Bailey | H04L 63/0861 |
| 2017/0366553 A1 | 12/2017 | Shetye et al. | |
| 2018/0075478 A1 | 3/2018 | Rogas | |
| 2018/0108015 A1 | 4/2018 | Rogas | |
| 2020/0065814 A1* | 2/2020 | Fang | G06Q 20/4014 |
| 2022/0279016 A1* | 9/2022 | Moeck | H04L 63/1483 |

* cited by examiner

```
Example Content Page File

<html>
<head>
    <title>Sample Content Page</title>    ← 510
</head>
<body>
<p> .... </p>

<iframe name="content2" src="about:blank" width="300" height="250"></iframe>    ← 520
<!-- Load network security tag to determine if the client is spoofed or real -->
<script
    type="text/javascript"
    src="//tags.networksecurity.com/tag/antispoof.js"    ← 530
</script>

<!-- Populate iframe with content from content provider 2 (if not a spoofed client) -->
<script
    type="text/javascript"
    src="//tags.contentprovider2.com/tag/supplycontent.js"    ← 540
</script>

<p> .... </p>    ← 510
</body>
</html>
```

500

NETWORK DEVICE DETECTION AND VERIFICATION PROTOCOL

CROSS-REFERENCE TO RELATED APPLICATIONS

This application is a continuation of U.S. Utility application Ser. No. 16/230,639, which was filed on Dec. 21, 2018, is entitled "NETWORK DEVICE DETECTION AND VERIFICATION PROTOCOL, and claims priority to U.S. Provisional Application No. 62/609,789, which provisional application was in turn filed on Dec. 22, 2017 and is entitled "NETWORK DEVICE DETECTION PROTOCOL". The disclosure of both of these applications is expressly incorporated by reference herein in their entirety for all purposes. Any and all applications, if any, for which a foreign or domestic priority claim is identified in the Application Data Sheet of the present application are hereby incorporated by reference in their entireties under 37 CFR 1.57.

BACKGROUND

This application relates to electronic communication between devices in a computer network. Many communications between devices include the transfer of data for user consumption. For example, a computing device may request content on behalf of a user for presentation to a user. This content may include various forms of media, such as images, audio, video, or text. The media may be news articles, pictures, animations, movies, video games, and the like. It is often desirable to track the access or consumption of media. For example, the determination of popularity of certain media may affect a decision as to whether to produce additional content.

SUMMARY

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

Certain aspects of the disclosure relate to a system for determining whether computer network activity is spoofed. The system may include a first network device configured to receive packets over a network from a spoofed network device. The first network device may comprise a hardware processor programmed to: inspect the packets received from the spoofed network device to identify a unique identifier inserted into the packets at the spoofed network device by browser tag code that is in communication with the first network device; query the spoofed network device for a digital fingerprint indicative of a legitimate network device; identify that the query does not result in receiving the digital fingerprint; send a request to a third-party service along with the unique identifier to obtain an indication of whether the spoofed network device has transmitted the packets through a mobile network, a beacon network, a point-of-sale network, or an alternative verified connection service provider; and subsequent to not receiving an indication from the third-party service that the spoofed network device has transmitted the packets through a mobile network, a beacon network, a point-of-sale network, or an alternative verified connection service provider, prevent a delivery of content packets to the spoofed network device.

The system of the preceding paragraph can include any sub-combination of the following features: where the first network device is further configured to record data associated with the identification in a distributed data structure; where the third-party service is a location service, a cellular network service, a point-of-sale network, or an alternative verified connection service provider; and where the first network device is further configured to prevent the delivery of content packets to the spoofed network device by not supplying a certification of legitimacy of the spoofed network device to a content provider of the content packets, wherein the content provider is enabled to refrain from delivering the content packets to the spoofed network device despite receiving a request from the spoofed networked device to deliver the content packets to the spoofed network device.

Additional aspects of the disclosure relate to a system for determining whether computer network activity is spoofed. The system may include a first network device configured to receive packets at a first time period over a network from a second network device. The first network device may comprise a hardware processor programmed to: inspect the packets received from the second network device to identify a unique identifier inserted into the packets at the second network device by browser tag code that is in communication with the first network device; query the second network device for a digital fingerprint indicative of a legitimate network device; identify that the query does not result in receiving the digital fingerprint; send a request to a third-party service along with the unique identifier to obtain an indication of whether the second network device has transmitted the packets through a mobile network or a beacon network; and subsequent to receiving an indication from the third-party service that the second network device has transmitted the packets through a mobile network or a beacon network, permit a delivery of content packets to the second network device.

The system of the preceding paragraph can include any sub-combination of the following features: where the first network device is further configured to permit the delivery of content packets to the second network device by sending a certification to a content provider, the content provider being a source of the content packets, the certification indicating that the second network device is a legitimate network device; where the first network device is further configured to record data associated with the certification in a distributed data structure; where the first network device is further configured to create a second digital fingerprint and store the second digital fingerprint at the second network device, subsequent to receiving the indication from the third-party service that the second network device has transmitted the packets through a mobile network or a beacon network; where the first network device is further configured to store the second digital fingerprint in a browser cookie, or in other stored identification data or code, at the second device; where the second digital fingerprint is a persistent identifier that is maintained on the second device for a threshold period of time; where the threshold period of time is associated with a time-to-live value; where the first network device is further configured to: receive packets at a second time period from the second network device; query the second network device for the second digital fingerprint; identify that the query results in receiving the second digital fingerprint; and provide an indication to the second network device that the second network device is a legitimate network device; where the indication is provided to the browser tag code that is in communication with the first network device; where the first network device is further configured to reset the time-to-live value at the second network device; where the first network device is further configured to store the persistent identifier at a third network device subsequent to determining that packets received from the third network device identify the unique identifier inserted into the packets at the third network device; and where the indication comprises a hashed mobile device number.

Additional aspects of the disclosure relate to a method of determining whether computer network activity is not spoofed. The method may be implemented by a hardware processor of a network security system. The method may include: receiving a packet at a first time period from a client device associated with a session identifier responsive to the client device accessing a webpage from a content provider; determining the session identifier from the packet; providing the session identifier to a cellular network provider to determine whether the client device communicated with the content provider via a cellular network; receiving an indication from the client network provider that the client device communicated with the content provider via the cellular network; generating a digital fingerprint associated with the client device subsequent to receiving the indication that the client device communicated with the content provider via the cellular network; and storing the digital fingerprint at the client device, wherein the digital fingerprint indicates that the client device is associated with an account at a cellular service provider associated with the cellular network.

The method of the preceding paragraph can include any sub-combination of the following features: where the method further comprises assigning a time-to-live value to the digital fingerprint at the client device; where the method further comprises: receiving a second packet at a second time period from the client device responsive to the client device accessing a second webpage from a second content provider; querying the client device for the digital fingerprint; receiving the digital fingerprint responsive to querying the client device for the digital fingerprint; and providing an indication to the client device that the client device is associated with the account at the cellular service provider; and where the method further comprises: receiving a third packet at a third time period from the client device responsive to an application at the client device being used at a point-of-sale; accessing a data store associated with the network security system to determine whether the digital fingerprint is associated with the client device; determining that the digital fingerprint is associated with the client device; storing the digital fingerprint in a memory location at the client device associated with the application; and updating a profile associated with the client device at the data store to indicate usage of the client device at the point-of-sale.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

These and other features, aspects, and advantages of the present disclosure are described with reference to the drawings of certain embodiments, which are intended to schematically illustrate certain embodiments and not to limit the disclosure.

DETAILED DESCRIPTION

Although certain examples are described herein, those of skill in the art will appreciate that the disclosure extends beyond the specifically disclosed examples and/or uses and obvious modifications and equivalents thereof. Thus, it is intended that the scope of the disclosure herein disclosed should not be limited by any particular examples described herein.

I. Overview

It is common for mobile devices to contact other devices (such as servers) across a network (such as the Internet) to obtain documents (such as web pages). A server can supply content to a mobile device so that the mobile device can output the content for consumption by a user, for example, in a browser or mobile application. Advertisements are examples of content that can be served to a mobile device. In some scenarios, a website owner hosts a website to which advertisements are served. The website owner can be paid a small sum for each advertisement that is served to the mobile device in what is sometimes referred to as a cost per impression ("CPI") model. Thus, if several users of mobile devices visit the website and each one is served an advertisement (or "ad"), then each time the ad is served the owner of the website may be paid a small amount. Cumulatively, the effect of serving many ads to mobile users can be lucrative to the website owner. In another scenario, the owner of the website is paid when the users select or otherwise click on the advertisement, in what is sometimes referred to as a cost-per-click ("CPC") model. Other models that can be used include the cost-per-acquisition ("CPA") model, cost-per-view ("CPV") model, and the cost-per-thousand impressions ("CPM" or sometimes "CPT") model.

These types of advertising arrangements are beneficial for website owners but are also ripe for fraud. There are, in fact, many computer systems around the world that are designed to spoof or fake a mobile device so as to appear to be a mobile device and thereby pretend to be accessing a spoof website to request advertisements. In one example scenario, a spoofed mobile device (often referred to herein as a "spoofed client") is used by a provider of a spoof website to defraud an advertiser or advertising network. The spoofed client may actually be a desktop or laptop computer or can otherwise be any computing device that is not a legitimate mobile device in communication with a cellular network. For instance, the spoofed client can supply metadata in its HTTP headers that states that the spoofed client is a mobile device using a mobile operating system, when in fact the spoofed client is not. A user uses the spoofed client to access the spoof website and thereby request ads repeatedly. As a result, the requested ads are served fraudulently to the spoof website so that the website provider obtains payment for the ads even though they are not seen by any legitimate user or served to any legitimate device. In certain embodiments, the spoofed mobile device may be a real mobile device that is included in a device farm as one of many mobile devices that attempt to imitate user activity to generate increased revenue (e.g., via increased CPCs, etc.).

Existing solutions attempt to determine after the ads are served, whether the ads were served legitimately or not. Such solutions are inadequate because even if they identify a fraudulent delivery of ads, the payment has already been made. Additionally, existing solutions rely on techniques that can only imprecisely detect some, not all, fraudulent activity. Fraudulent users continually work to defeat these systems, and thus significant fraud is bound to continue.

Certain embodiments of this disclosure describe techniques for detecting a spoofed network device and preventing the serving of content, such as advertisements, to the spoofed network device. In certain embodiments, a network security system is provided. The network security system can include hardware and/or software programmed to prevent the provision of content to a spoofed client device. The network security system can provide a mechanism for certifying to content providers, such as advertisers, whether or not a client is a legitimate mobile device or a spoofed device. Accordingly, content providers can prevent the delivery of content to fraudulent devices instead of relying on imprecise solutions that detect fraudulent activity after it has occurred. Any of the embodiments described herein can also be used in conjunction with existing solutions, including biometric algorithms or any of the existing solutions described herein. In certain embodiments, the network security system may confirm whether a client device is associated with a human user and/or is not a spoofed client device.

It should be noted that the embodiments described herein can be used with browsers accessing web sites and/or with mobile/native applications accessing a server to obtain content for the mobile/native application. For ease of illustration, this specification will primarily describe examples in the browser context.

II. Example Computing Environment

Figure 1:
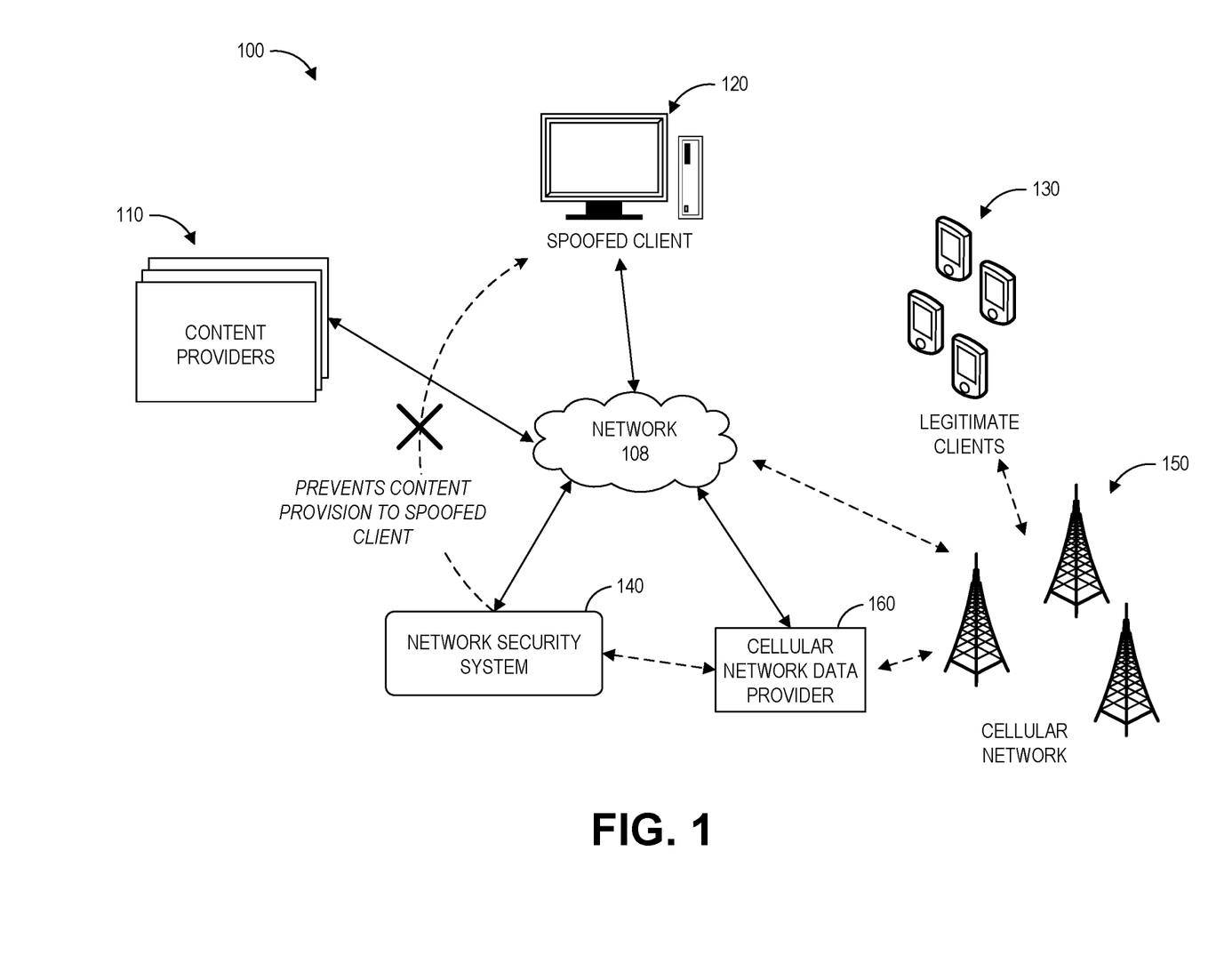
FIG. 1 depicts an example computing environment that can implement an embodiment of a network security system.

Turning to FIG. 1, an example computing environment 100 is shown in which a network security system 140 can prevent or attempt to prevent content provision to a spoofed client 120. In the computing environment 100 shown, a content provider 110, a spoofed client 120, the network security system 140, and a cellular network data provider 160 each communicate via network 108, which may be a local area network (LAN), a wide area network (WAN), the Internet, an Intranet, combinations of the same, or the like. Each of the devices shown may be computing devices having a processor and memory. Additional examples of computing devices, which may be applied to any of the devices shown, are described below in the "Terminology" section.

Legitimate mobile clients 130 are shown communicating through the network 108 through a cellular network 150. An example of a legitimate mobile client 130 is a cell phone or smartphone used by a mobile user who is not attempting to defraud a content provider (e.g., an advertiser). In one scenario, a legitimate client 130 attempts to communicate with a content provider 110 by sending data packets through the cellular network 150, which are transmitted through the network 108 (e.g., Internet) and eventually to the content provider 110. The content provider 110 can rely on the services of the network security system 140 to determine whether the client 130 is a legitimate mobile client. In response to receiving an indication that the mobile client 130 is legitimate, the content provider 110 can serve content (such as an ad) to the legitimate client 130 through the network 108 and the cellular network 150.

It is also possible for legitimate clients 130 to connect directly to the network 108, not through the cellular network 150. For example, legitimate clients 130 can connect directly to the network 108 through a wireless or Wi-Fi network. It is possible in some embodiments for the network security system 140 to determine that such clients 130 are legitimate even when they connect through a Wi-Fi network. However, in many embodiments the network security system 140 relies on aspects of the cellular network 150 to determine whether the clients 130 are legitimate.

For instance, a legitimate client 130 can execute a script, embedded within a content page, that communicates with the network security system 140. Upon receiving a communication from the script, the network security system 140 can communicate with cellular network data provider system 160 to request a session identifier. The network security system 140 can provide this session identifier to the legitimate client 130. The script at the legitimate client 130 can transmit packets with the session identifier through the cellular network 150. The script can then call the network security system 140, which contacts the cellular network data provider system 160 to request a mobile number corresponding to the session identifier.

Because the legitimate client 130 would have transmitted the session identifier through the cellular network 150, the cellular network data provider system 160 can respond with a hash of the mobile device number. The network security system 140 can then certify that that client 130 is legitimate to the content provider 110. Thus, the content provider 110 can have a degree of comfort that it will be serving content to a legitimate client 130 instead of a spoofed client 120. In contrast, a spoofed client 120—such as a laptop or desktop computer or any other device that does not connect through the cellular network 150—likely does not communicate through the cellular network 150, and does not have a mobile device number. Accordingly, packets from the spoofed client 120 would likely not show up in the cellular network data provider system 160 as having a mobile device number.

Thus, the network security system 140 can inspect or query the cellular network data provider 160 to determine whether the packets have a mobile device number. If they do not, then the network security system 140 can prevent provision of content (such as an ad) from the content provider 110 to a spoofed client 120. For example, the network security system 140 may not provide a certification of legitimacy to the content provider 110 or may provide a certificate or indication of illegitimacy indicating that the client is spoofed. Alternatively, in certain embodiments, the content may be provided to the spoofed client 120, but the provisioning of the content may be marked differently, or not counted in the same manner as content provided to a legitimate client 130. Accordingly, in some cases, the obtaining of content or the triggering of content provisioning by a spoofed client 120 may have less value than the provisioning of content to a legitimate client 130, or, in some cases no value.

The network security system 140 can determine whether a client is legitimate or spoofed in other ways than by requesting a mobile device number (or hash thereof) from the cellular network data provider 160. In some embodiments, the network security system 140 contacts a location service instead of the cellular network data provider 160. The network security system 140 can contact the location service to determine if packets from the client 130 containing a session identifier are locatable, in a similar manner to querying for a mobile device number hash.

In one embodiment, the network security system 140 supplies a security tag or the like to the content providers 110. The security tag can be a script or reference to a script that can be incorporated in a content page so that the tag is executed before an ad or other content is loaded. For instance, a first content provider 110 can supply the security tag to a second content provider who serves a content page that will incorporate the first content provider's content. The second content provider 110 (e.g., the computer system thereof) can insert the security tag in the content page code. Thereafter, when a legitimate client 130 accesses the content page (e.g., a normal web page) from the second content provider 110, the content page along with the security tag can be sent to the legitimate client 130. Browser software at the legitimate client 130 can cause the security tag to execute, which may then call code at the network security system 140. This code at the network security system 140 can attempt to verify whether the client is legitimate, using, for example, any of the processes outlined above and described in detail below. The network security system 140 can respond with an indication that addresses the question whether the client is legitimate or spoofed. If legitimate, the first content provider can supply its content (e.g., the ad) to the legitimate client 130.

III. Second Example Computing Environment

Figure 2:
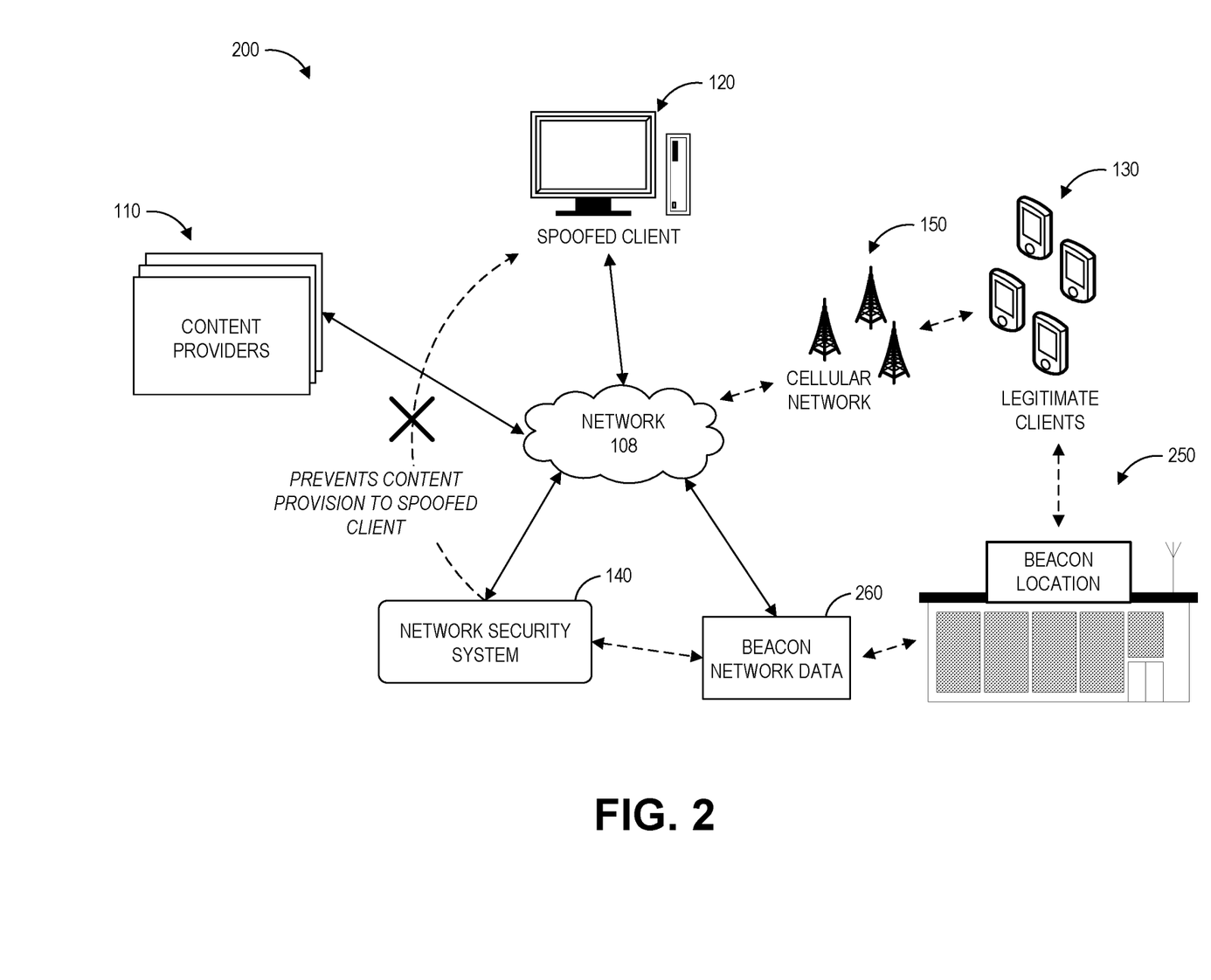
FIG. 2 depicts another example computing environment that can implement an embodiment of a network security system.

FIG. 2 depicts another embodiment of a computing environment 200. The computing environment 200 includes all the features of the computing environment 100 except that in this embodiment, the legitimate clients 130 also communicate with a beacon network at a beacon location 250. The beacon location 250 may be any location that has one or more beacons, which may be wireless (e.g., Bluetooth, Wi-Fi, etc.) or audio beacons. The beacons may be deployed in a store or any other public or private location. Beacons are sometimes used by retail stores or other locations to provide a mechanism for mobile devices to automatically detect where they are and report this information to social media, among other uses.

The beacons at the beacon location 250 may supply beacon network data to a beacon network system 260. The network security system 140 can access the beacon network system 260 over the network 108 to determine whether or not packets have been sent from legitimate clients 130 or a spoofed client 120 (which does not communicate through the beacon network). Once the network security system 140 determines that a legitimate client 130 has communicated data through the beacon network, the network security system 140 can report that the client is legitimate (or vice versa).

IV. Example Client Communication Processes

Figure 3A:
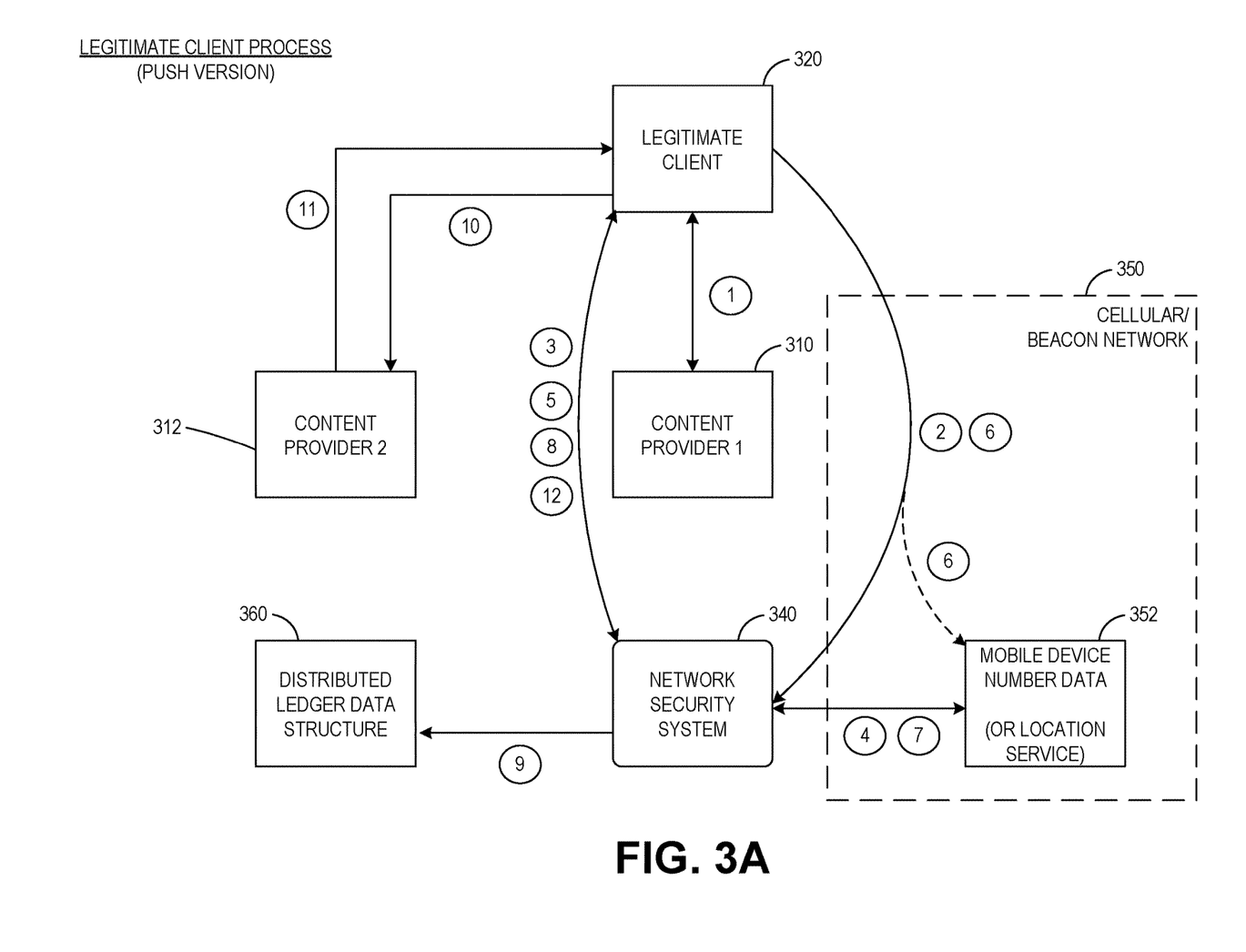
FIG. 3A depicts an embodiment of a process for detecting a legitimate client device.
Figure 3B:
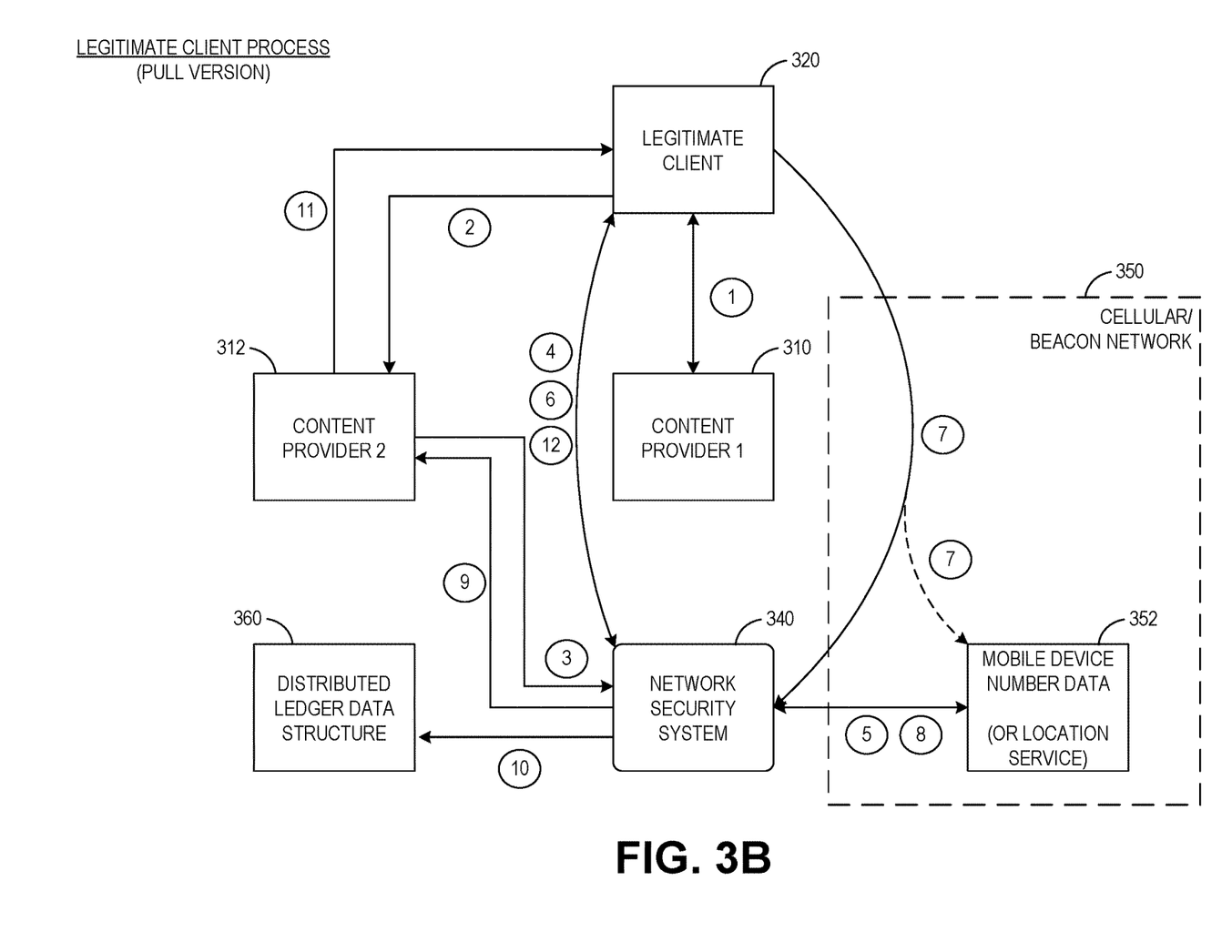
FIG. 3B depicts another embodiment of a process for detecting a legitimate client device.
Figure 4:
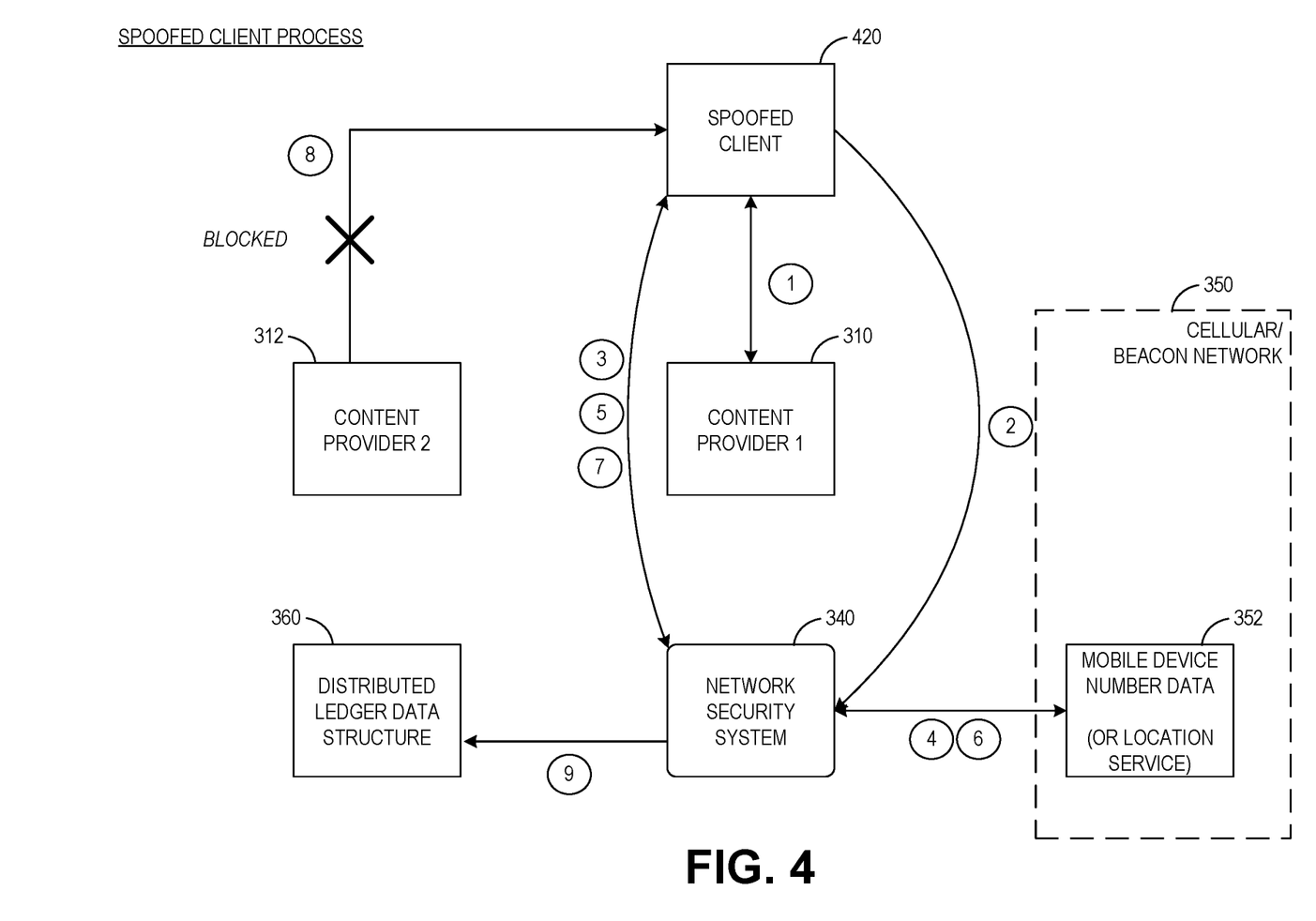
FIG. 4 depicts an embodiment of a process for detecting a spoofed client device.

FIGS. 3A and 3B depict embodiments of legitimate client processes that illustrate example ways in which the network security system 140 can determine whether a client is legitimate. FIG. 4, which will be described in greater detail below, depicts an embodiment of a spoofed client process that shows how a network security system can detect that communications have been spoofed. In an example implementation, the processes of FIGS. 3A and 3B as well as the process of FIG. 4 may in actuality be the same process, just showing two different outcomes (legitimacy in FIGS. 3A/3B and spoofed in FIG. 4).

In FIG. 3A, components similar to those described with respect to FIGS. 1 and 2 are shown. For instance, a content provider 1 (310) is shown, which corresponds to one of the content providers 110 in FIGS. 1 and 2. Likewise, a content provider 2 (312) is shown, which can be another one of the content providers 110 of FIGS. 1 and 2. The content provider 1 may be a content provider that serves a main page, such as any website, which a user of the legitimate client 320 may request content from. The content provider 2 may be an advertiser or the like that supplies ads or other content to be incorporated in the content page supplied by content provider 1.

For instance, the content provider 1 may serve a web page referred to as index.html (e.g., a home page). The web page or content page may include a link or URL that points to an object such as an advertisement image or video on the content provider 2 system. A browser (or mobile application) on the legitimate client 320, when accessing the index.html content page, could identify the link to the object on the content provider 2 system, and could ordinarily attempt to obtain that object by querying the content provider 2. However, in this embodiment, a network security system 340 (which can have all the functionality of the network security system 140 described above) is provided to confirm whether the client 320 is legitimate. The content provider 2 can deliver the requested content object to the legitimate client 320, based on the determination by the network security system 340 that the client 320 is legitimate.

Referring again to FIG. 3A, circled numbers in the figure represent states in a state flow, steps, or conditions. The circled numbers attempt to indicate an approximate order of different states, and arrows indicate transitions from one state to another. The numerical order shown is merely approximate because different systems may perform tasks in parallel or substantially in parallel, and some tasks may be performed asynchronously. Thus, the order depicted in FIG. 3A (as well as in FIGS. 3B and 4) represents one embodiment and should not be construed as strictly limiting. Except where otherwise indicated, components shown in these Figures can communicate via a network such as the network 108 described above.

In FIG. 3A, at state 1 a legitimate client 320 accesses the content provider 1 (310) to obtain a content page, such as a home page or other page on a content site. The content provider 1, in turn, supplies the content page to the legitimate client 320. When the legitimate client 320 receives the content page, the legitimate client's browser (or mobile application) can parse the content page to identify any objects to obtain from the content provider 1 or another provider (such as the content provider 2). Also at state 2, the browser at the legitimate client 320 can execute one or more tags, including a security tag supplied by the network security system 340 previously to the content provider 2, which in turn may have supplied this security tag to the content provider 1.

For example, the network security system 340 may have provided a security tag to the content provider 2 previous to the process shown in FIG. 3A. The security tag can be a script or the like. This security tag may be supplied by the content provider 2 along with a content tag or script that can supply content (such as an ad), should the client 320 be proven legitimate. The content provider 2 can provide both the security tag and its own content tag to the content provider 1, which can programmatically embed these tags or scripts into the content page.

Figure 5:
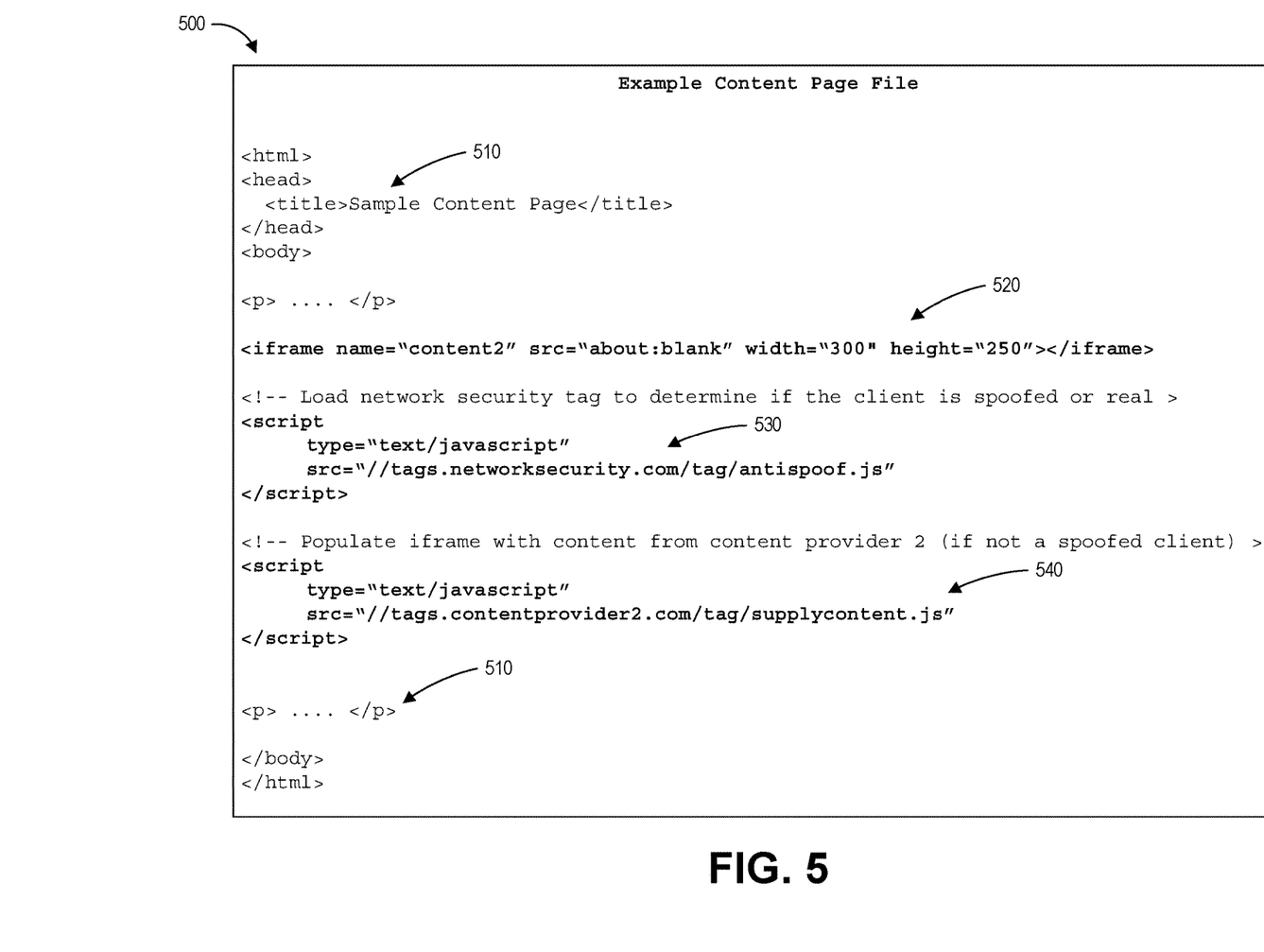
FIG. 5 depicts an example content page file including a network security tag that can be used to determine whether a client is spoofed or legitimate.

To illustrate, turning to FIG. 5, an example content page file 500 is shown. The content page 500 includes html mark-up language 510, 520 and script language 530, 540 that depicts an example way to include a security tag from the network security system 340 and a content tag from the content provider 2 into a content page provided by the content provider 1. In this embodiment, the html mark-up language 510 can define the look and feel of certain aspects of the page. The html mark-up language item 520 can define an iframe, which is one example of an html element that can receive content from the content provider 2. The content page file 500 further includes a reference to a security tag 530 (referenced by the filename "antispoof.js") and a reference to a content tag 540 ("supplycontent.js").

Execution of the html iframe element 520 by the browser can first cause a blank iframe to be loaded. Then, the security tag 530 can be executed, causing a determination of whether the client to whom the content page was served is legitimate or spoofed. Thereafter, the content tag 540 can be executed. If execution of the security tag 530 results in a determination that the client is legitimate, the content tag 540 may populate the iframe with content (such as an ad). In one embodiment, the security tag executes before some or all of the content page is loaded or displayed by the browser. In some embodiments, the security tag is instead embedded within the content tag 540, so that when the content tag 540 is called, it calls the security tag 530, so that the content tag 540 can receive the results of the security tag 530. This latter embodiment is relied on in FIG. 3A.

Turning back to FIG. 3A, at state 2, the legitimate client 320 can execute the security tag to call the network security system 340. At state 3, the network security system 340 attempts to determine whether the legitimate client 320 has a digital fingerprint stored thereon. For instance, the network security system 340 (or the security tag) can attempt to access a digital fingerprint stored in a cookie in the browser at the legitimate client 320. In one embodiment, the security tag at the client 320 can query the client's 320 browser cookie data store to determine whether the network security system 340 had previously stored a digital fingerprint at the legitimate client 320, which can indicate that the client 320 is in fact legitimate. If a digital fingerprint is found, the security tag can transmit the digital fingerprint over the network to the network security system 340.

If the network security system 340 receives a digital fingerprint determining that the client 320 is legitimate, then the network security system 340 can proceed to state 8 and 9. However, if the network security system 340 does not receive an indication of a digital fingerprint from the legitimate client 320, the network security system 340 can request and receive a session identifier from the mobile device number data or location service 352 at state 4 (which is an example of the cellular network data provider 160 in one implementation). The network security system 340 can return the session identifier to the client 320 at state 5.

At state 6, the security tag at the client 320 can cause the client to transmit one or more packets with the session identifier through the cellular or beacon network 350. The cellular or beacon network 350 can detect that the packet(s) with the session identifier were transmitted through the network 350. At state 7, the network security system 340 can request one of two things from the network 350: (1) a mobile device number hash corresponding to the session identifier, from the cellular network, or (2) an indication that the device is locatable from the location service (which may be included in the cellular network or in a separate beacon network). Upon receiving a positive indication of such (which can indicate that the client 320 is legitimate), the network security system 340 can proceed to state 8.

At state 8, the network security system 340 can return an indication to the client 320 (e.g., to the content tag 540 running on the client) that the client 320 is legitimate. The certification may be in the form of a receipt or the like which may be alphanumerical (e.g., a string of letter(s) and number(s)), merely numerical (e.g., any number(s)), or merely alpha (e.g., a string of letters). In one embodiment, the certification contains a 32-bit number that may be unique. In certain embodiments, the certification may include or may be associated with a confidence value indicating that the client 320 is legitimate. This confidence value may vary over time based on activity of the client 320 determined by the network security system 340. For example, if it is determined that the client 320 was used at a point-of-sale, the confidence in the legitimacy of the client 320 may increase.

At state 9, the network security system 340 may also store the certification in a distributed ledger data structure 360. The distribution ledger data structure 360 is an example of a distributed data structure, and may be a block chain or the like. The blockchain may be implemented according to the Bitcoin™, Ethereum™, or other standards or according to another form of digital currency. By storing the certification in the distribution ledger data structure 360, the network security system 340 can ensure or attempt to ensure that the certification will be publicly available so that a future audit of the certification can be performed. The content providers 1 and 2 can later access the distributed data structure 360 to access the data stored therein.

At state 10, the legitimate client 320 (e.g., the content tag 540) supplies a request to the content provider 2 for content. For instance, the content tag 540 can supply the request for content because the security tag 530 returned an indication that the client 320 is legitimate. At state 11, the content provider supplies the content to the client 320 because the client is legitimate as certified by the network security system 340.

At state 12, the network security system 340 can store or update an existing digital fingerprint at the legitimate client 320. For example, the network security system 340 can create or update a cookie at the legitimate client 320 to store an indication that the client is legitimate. The digital fingerprint can include any of a variety of data including the certification data from which service the unique identifier was obtained. The unique identifier itself, the method used to obtain or determine legitimacy of the client and so on. Storing the digital fingerprint at the legitimate client 320 can enable determination of client legitimacy to be done faster on subsequent accesses by, for example, accessing a caching mechanism in one embodiment. Moreover, by storing the digital fingerprint at the legitimate client 320, both processing and networking resources can be reduced during subsequent content access because, for example, the network security system 340 can confirm that the client 320 is legitimate at state 3 by accessing the cached digital fingerprint, thereby eliminating a number of the previously described state communications, such as the requests at state 7.

In certain embodiments, the digital fingerprint may be associated with a time-to-live value or an expiration value. If the digital fingerprint is expired, the network security system 340 may determine at state 3 that the client 320 does not include a digital fingerprint. Alternatively, the network security system 340 may determine that the client 320 includes an expired digital fingerprint. In certain embodiments, a content provider, such as the content provider 2, may treat clients 320 with expired digital fingerprints differently than clients 320 that are not associated with a digital fingerprint. For example, a client 320 with an expired digital fingerprint may receive content from the content provider, but the content may not be included in an accrual of the number of clients to access content, while a client with no digital fingerprint may not receive the content.

Advantageously, in certain embodiments, by expiring digital fingerprints, it is possible to reduce the impact of legitimate clients 320 that have been converted to non-legitimate clients. For example, in one use case, a user may legitimately purchase and use a smartphone. This smartphone may legitimately be used to access content for a time period and may therefore acquire a digital fingerprint using embodiments disclosed herein. The user may then upgrade his or her device and sell the smartphone to another user, referred to in this example as the "new user." This new user may not be a legitimate user, but may instead add the purchased smartphone to a device farm that using automated software (sometimes referred to as a "bot") causes the smartphone to continuously click on advertisements on a spoof website to generate income for the new user. The device may, for a period of time, be identified as legitimate because of the stored digital fingerprint. However, because the device is no longer registered with the cellular network data provider 160, the digital fingerprint will eventually expire, and the device may cease to be identified as a legitimate client. Moreover, if another device associated with the same user, or with the same MDN or MDN hash, as the client 320, is identified, the digital fingerprint may be associated with the new device. In certain embodiments, the network security system 340 may disassociate the digital fingerprint with the client 320 at a repository associated with the network security system 340. Further, the network security system 340 may remove or otherwise invalidate the digital fingerprint at the client 320. Thus, in certain embodiments, if a user uses a new device, a previous device may have its digital fingerprint removed or invalidated.

The frequency of how often to expire the digital fingerprint can be determined by a policy of the network security system 340 and may be every day, month, year or some other frequency. In some embodiments, the network security system 340 may use digital fingerprints from a plurality of users to generate a profile of the users who access the content provider 2 and/or content provider 1. The network security system 340 can use this information to determine the location of users, whether they are traveling, and so forth. The digital fingerprint can be called a SIMprint™, referring to the fact that the legitimate client 320 can be a mobile device and may therefore have a SIM card.

In certain embodiments, the process of confirming the legitimacy of the client 320 can be repeated intermittently at scheduled time periods, or in response to a trigger. If the network security system 340 continues to determine that the client 320 is legitimate, the digital fingerprint can be refreshed or updated. Refreshing the digital fingerprint may include resetting the time-to-live value associated with the digital fingerprint.

In certain embodiments, at least certain packets delivered via the cellular network 350 may include a special header that identifies the mobile device number ("MDN"), or some other unique identifier, associated with the client 320. This special header may be a separate header than that used for formatting and/or transmitting data packers, such as the HTTP header. While the HTTP header may be accessible by the client 320, the content providers 310 and 312, and other computing systems in a network, the special header may typically be accessible by only the cellular network 150. However, in certain embodiments, certain trusted third-party systems may be permitted to access the special headers. The special header may include the hashed version of the phone number associated with the legitimate client 320. In certain embodiments, the network security system 340 may be a trusted third-party that is permitted to access the special headers used by the cellular network 350. The network security system 340 can access the special header in a communication packet sent by the client 320. If the special header exists, the network security system 340 can determine that the client 320 is legitimate.

It should be understood that, in certain embodiments, the network security system 340 can determine the legitimacy of the client 320 by the existence of the special header without accessing the contents of the special header as a non-legitimate client will likely not communicate via the cellular network 350 and therefore, will not include the special header. Typically, non-legitimate clients will not communicate via cellular networks because such communication is often more expensive than communication via a non-cellular wireless network, particularly when used by device farms run by spoofers or other non-legitimate users because of the relatively large number of devices included in device farms.

In certain embodiments, the network security system 340 may communicate with a third-party system (e.g., a billing or accounting system) (not shown) that has a trusted relationship with the cellular network 350. The network security system 340 may ask the trusted third-party system to confirm whether a special header exists for communication with the client 320. The trusted third-party can determine the existence of the special header and can report the existence of the special header to the network security system 340, which can then determine that the client 320 is legitimate. Thus, the network security system 340 can determine the legitimacy of the client 320 without accessing private information associated with the user of the client 320. In certain embodiments, it is sufficient to determine that the client 320 is associated with an MDN at the cellular network 350 without accessing the MDN itself.

The embodiment shown in FIG. 3A may be referred to as a push version of the client process because the network security system 340 pushes the certification at state 7 to the content provider 2. As another embodiment, FIG. 3B shows a pull version of the legitimate client process that operates in many ways similar to the push version in FIG. 3A.

There is significant overlap between the processes in FIGS. 3A and 3B. However, instead of the security tag at the client 320 initiating the legitimacy checking process, the content provider 2 initiates the legitimacy checking process. At state 1, the legitimate client 320 requests and receives a content page from the content provider 310. The content page may include a content tag 540 that calls the content provider 2. This tag executes to call the content provider 2 at state 2.

The content provider 2 in turn sends a request to the network security system 340 at state 3 to determine whether the client 320 is legitimate. The network security system 340 at state 4 looks for the digital fingerprint at the legitimate client 320, and if finding it, the process proceeds to state 9.

If the digital fingerprint is not found, then at state 5 the network security system 340 requests the mobile device number data service or location service 352 for a session identifier, provides it to the client 320 at state 6, which in turn passes a packet through the network 350 with the session identifier at state 7. At state 8, the network security system 340 requests either a mobile device number hash or an indication of locatability of the packets with the session identifier from the service 352.

If such an indication is found, at state 9, the network security system 340 supplies the certification to the content provider 2. The network security system 340 can store an indication of the certification in the distribution ledger data structure at state 10. The content provider 2, upon receiving the certification at state 9, can then supply the content at state 11 to the legitimate client 320. At state 12, the network security system 340 can store or update an existing digital fingerprint at the legitimate client 320. For example, the network security system 340 can create or update a cookie at the legitimate client 320 to store an indication that the client is legitimate 320, as described above.

Turning to FIG. 4, an example of a spoofed client process is shown. As explained above, in one embodiment the process of FIG. 4 is part of the process of FIGS. 3A and/or 3B. However, for ease of illustration, it is drawn separately from those other processes to more clearly depict the differences between identifying a spoofed client 420.

The spoofed client process operates in many respects similarly to the processes described above with respect to FIGS. 3A and 3B. However, in this example, content that is requested at the content provider 2 is blocked from being delivered to the spoofed client 420. The spoofed client 420 operates in a similar manner to the legitimate client by accessing a content page from the content provider 1 at state 1. The spoofed client 420 then executes the tag provided by the network security system 340 at state 2 to call the network security system 340.

The network security system 340 at state 3 checks for a digital fingerprint at the spoofed client 420 and does not find one. Then, the network security system 340 requests a session identifier at state 4 from the service 352. The network security system 340 supplies the session identifier to the client 420 at state 5. The security tag at the client 420 attempts to transmit a packet with the session identifier, but the packet does not go through any cellular or beacon network. The network security system 340 queries the service 352 at state 6 to determine whether any packet with the session identifier has passed through the cellular or beacon network, and receives a negative response. The network security system 360 therefore returns an indication at state 7 to the security tag at the client 420 that the client is not legitimate. The content tag at the client therefore does not access the content provider 2, so that content is blocked (at state 8) from the content provider 2. Alternatively, the content tag supplies an indication that the client 420 is spoofed to the content provider 2, which then declines to supply content to the client 420. Similarly, at state 9 the network security system 340 can optionally store an indication of the lack of certification of legitimacy of the spoofed client 420 in the distribution ledger data structure 360.

In certain embodiments, the content provider 2 may elect to provide content to the spoofed client 420 regardless of whether the client is identified as legitimate. In some such embodiments, the content provider 2 may count the access of content by the spoofed client 420 differently than by the legitimate clients 320. For example, the content provider 2 may not include the access of content by the spoofed client 420 in an attribution process, a monetary accounting, or in any other type of decision making process that may be based on the amount of accesses of content hosted by the content provider 312.

In certain embodiments, the client 420 may not be identified as legitimate because, for example, a digital fingerprint is not located at the client and/or a mobile device number is not obtained from the cellular network for the client 420. In some such embodiments, the client 420 may still be legitimate. For example, the client 420 may have been communicating on Wi-Fi and may not yet have been accessed over the cellular network 350. To avoid falsely identifying a legitimate client as being a spoofed client, in certain embodiments, the network security system 340 may identify clients as either legitimate or unverified. Unverified clients may be processed based on policy rules determined by the content provider 312. These policy rules may include treating the client 420 as legitimate or providing content, but not counting the provisioning of content towards metrics monitored by the content provider 312.

V. Additional Embodiments

It is possible to use other location information to determine whether a client is legitimate. For instance, in some embodiments, location triggers can be used to determine a client's legitimacy. If a client includes a mobile application (or browser) that is typically used in a certain location, the network security system can leverage that usage information to identify a legitimate client. A code library can be embedded such that the code library is triggered under certain conditions. This code library may include code embedded in an application created by a third-party (e.g., an entity that differs from the entity that owns or manages the network security system 340) that uses an application programming interface (API) provided by an entity associated with the network security system 340. When the application is accessed, or when particular conditions are satisfied when using the application, the application may access the network security system 340 or provide data to the network security system 340 that enables the network security system 340 to determine that the client 320 is legitimate. In certain embodiments, the network security system 340 may use the data provided by the application to reset a time-to-live associated with a digital fingerprint stored at the legitimate client 320.

For example, if a client has installed a Starbucks™ application, and the user of the client visits a Starbucks™ shop and uses the application at the shop, e.g., to purchase something at a point of sale, a code library embedded in the Starbucks™ application can access the network security system. The code library may indicate, for instance, that the Starbucks™ application has been used at a real Starbucks™ location. The code library may also report a GPS location or the like. Thus, the network security system can determine that the client is legitimate, optionally store a fingerprint, or reset a time-to-live value associated with the fingerprint, and otherwise operate as described above.

In certain embodiments, the use of additional signals or location triggers enables the network security system 340 to confirm that a human user is associated with the client 320 and that the client 320 is being used legitimately instead of to spoof a device or to perform other malicious activity. For example, a malicious user will typically not use a device that is configured to mimic user ad clicks to visit a coffee shop and purchase coffee with the device. Thus, if the device is detected as being used at a coffee shop via the coffee shop's loyalty application installed on the device, there is relatively high degree of probability that the device is associated with a legitimate user.

In certain embodiments, the digital fingerprint associated with the legitimate client 320 can serve as a persistent identifier that can be refreshed in response to actions performed by a user accessing the client 320 using applications or webpages that integrate the features disclosed herein. In other words, the digital fingerprint that is stored when the user accesses the content provider 310 using the client 320 will be the same each time the client 320 accessed the content provider 310, will be the same when the user accesses another content provider, and will be the same when accessing an application, such as a rewards app that communicates with a point-of-sale or a banking app, on the client 320 that communicates over a network. For example, in one example use case, when the client 320 is used to access a webpage hosted by the content provider 310 over the cellular network 350, the network security system 340 can generate the digital fingerprint, using for example the process of FIG. 3A or FIG. 3B, and stored on the client 320 in a memory space associated with a browser at the client 320 (e.g., as a cookie). During a subsequent access of a webpage, the digital fingerprint can be refreshed, or the time-to-live value may be reset.

Continuing the use case example, when the user accesses a point-of-sale at a retail location using an application on the client 320, the application can communicate with the network security system 340 to determine that the client 320 has a digital fingerprint, which was generated when the client 320 was first identified during access of the content provider 310. This digital fingerprint may then be stored with the application, or in its memory space on the client 320. If the user uses the point-of-sale again, for example the user re-visits the coffee shop, or another in the franchise, the following week, the application (e.g., the coffee shop application) can provide the digital fingerprint back to the network security system 340 providing additional information confirming that the client 320 is still legitimate.

In certain embodiments, if the client 320 subsequently accesses the content provider 310, the network security system 340 may again confirm the device is legitimate by accessing the cellular network 350 using the processes described with respect to FIGS. 3A and/or 3B above. Alternatively, in certain embodiments, the network security system 340 can determine that the client 320 is legitimate based on the previous access to the point-of-sale at the retail location and can store the digital fingerprint associated with the client 320 at the client 320 or can reset the time-to-live value for the previously stored digital fingerprint at the client 320.

In certain embodiments, the interactions with the network security system 340 are stored at the data structure 360 and are associated with the client 320. Accordingly, when a request is made to the network security system 340 to determine the legitimacy of the client 320, the network security system 340 can access the data structure 360 to determine recent activity associated with the client 320 and whether the recent activity can confirm the legitimacy of the client 320, or the probability that the client 320 is legitimate.

Further, when a user obtains a new device, or clears the cache from an existing device, the network security system 340 may not be able to determine whether the device is legitimate at first. Once the user attempts to access content, such as from the content provider 310, over the cellular network 350, the network security system 340 may request an MDN, or an associated hash, for the client 320. This associated hash may be a hash of the MDN, a hash of a header that includes the MDN, or any other hash that may be associated with the MDN. The network security system 340 can then compare the MDN to those stored at the data structure 360. If the network security system 340 determines that it knows the MDN, it can access the associated digital fingerprint from the data structure 360 and store the digital fingerprint at the client 320, or the user's new device. Thus, the digital fingerprint may be persistent for the user across devices of the user associated with the same number at the cellular network 350.

Further, in certain embodiments, the digital fingerprint may be persistent across multiple device of the user. In certain embodiments, user activity may be tied together across multiple devices. For example, an email client may inform the network security system 340 that the user accessed a particular email account using the client 320. If it is later determined that the user accessed the same email account on a second device, it may be determined that the second device is associated with the same user and the same digital fingerprint may be provided to the second device. In the previous example, it is possible that the second device is not owned by the same user. However, it is likely that the second device is a legitimate device based on access of the same email account on the second device as was accessed on the client 320.

In certain embodiments, the network security system 340 may generate a profile for the client 320 over time. This profile may include information relating to actions performed by the client 320 at different locations. For example, the profile may identify that the client 320 communicated over the cellular network 350 at different times and/or locations. As another example, the profile may identify that the client 320 downloaded particular software (e.g., video games). As yet another example, the profile may identify that the client 320 used various payment applications or loyalty applications at different retail locations. Based on the generated profile, the network security system 340 can determine whether the client 320 is legitimate as opposed to being used for ad spoofing or other malicious activities. Alternatively, or in addition, the network security system 340 can determine a confidence level that the client 320 is legitimate.

VI. Terminology

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Although this disclosure has been described in the context of certain embodiments and examples, it will be understood by those skilled in the art that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may comprise, additional to its essential features described herein, one or more features as described herein from each other embodiment of the invention disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount.

The scope of the present disclosure is not intended to be limited by the specific disclosures of embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A method of determining whether computer network activity is not spoofed, the method comprising:
   as implemented by a hardware processor of a network security system,
       receiving a packet at a first time period from a client device associated with a session identifier responsive to the client device accessing a webpage from a content provider;
   determining the session identifier from the packet;
       providing the session identifier to a cellular network provider to determine whether the client device communicated with the content provider via a cellular network;
       receiving an indication from the client network provider that the client device communicated with the content provider via the cellular network;
       generating a digital fingerprint associated with the client device subsequent to receiving the indication that the client device communicated with the content provider via the cellular network;
       storing the digital fingerprint at the client device, wherein the digital fingerprint indicates that the client device is associated with an account at a cellular service provider associated with the cellular network;
       receiving the digital fingerprint from the client device; and
       providing an indication that the client device is associated with the account at the cellular service provider.

2. The method of claim 1, further comprising assigning a time-to-live value to the digital fingerprint at the client device.

3. The method of claim 1, further comprising:
   receiving a second packet at a second time period from the client device responsive to the client device accessing a second webpage from a second content provider;
   querying the client device for the digital fingerprint;
   wherein receiving the digital fingerprint from the client device is responsive to querying the client device for the digital fingerprint and wherein the indication is provided to the client device.

4. The method of claim 1, further comprising:
   receiving a third packet at a third time period from the client device responsive to an application at the client device being used at a point-of-sale;
   accessing a data store associated with the network security system to determine whether the digital fingerprint is associated with the client device;
   determining that the digital fingerprint is associated with the client device;
   storing the digital fingerprint in a memory location at the client device associated with the application; and
   updating a profile associated with the client device at the data store to indicate usage of the client device at the point-of-sale.

5. A system for determining whether computer network activity is not spoofed, the method comprising:
   a processor coupled to a network security system configured to:
       receive a packet at a first time period from a client device associated with a session identifier responsive to the client device accessing a webpage from a content provider;
       determine the session identifier from the packet;
       provide the session identifier to a cellular network provider to determine whether the client device communicated with the content provider via a cellular network;
       receive an indication from the client network provider that the client device communicated with the content provider via the cellular network;
       generate a digital fingerprint associated with the client device subsequent to receiving the indication that the client device communicated with the content provider via the cellular network;
       store the digital fingerprint at the client device, wherein the digital fingerprint indicates that the client device is associated with an account at a cellular service provider associated with the cellular network;
       receive the digital fingerprint from the client device; and
       provide an indication that the client device is associated with the account at the cellular service provider.

6. The system of claim 5, wherein the processor is further configured to assign a time-to-live value to the digital fingerprint at the client device.

7. The system of claim 5, wherein the processor is further configured to:
   receive a second packet at a second time period from the client device responsive to the client device accessing a second webpage from a second content provider; and
   query the client device for the digital fingerprint;
   wherein the digital fingerprint is received by the processor responsive to querying the client device for the digital fingerprint and wherein the indication is provided to the client device.

8. The system of claim 5, wherein the processor is further configured to:
   receive a third packet at a third time period from the client device responsive to an application at the client device being used at a point-of-sale;
   access a data store associated with the network security system to determine whether the digital fingerprint is associated with the client device;
   determine that the digital fingerprint is associated with the client device;
   store the digital fingerprint in a memory location at the client device associated with the application; and update a profile associated with the client device at the data store to indicate usage of the client device at the point-of-sale.

9. A method for determining whether computer network activity is spoofed, the method comprising:
  with a first network device configured to receive packets at a first time period over a network from a second network device:
    inspect the packets received from the second network device to identify a unique identifier inserted into the packets at the second network device by browser tag code that is in communication with the first network device;
    query the second network device for a digital fingerprint indicative of a legitimate network device;
    identify that the query does not result in receiving the digital fingerprint;
    send a request to a third-party service along with the unique identifier to obtain an indication of whether the second network device has transmitted the packets through a mobile network or a beacon network;
    subsequent to receiving an indication from the third-party service that the second network device has transmitted the packets through a mobile network or a beacon network, permit a delivery of content packets to the second network device; and
    create a second digital fingerprint and store the second digital fingerprint at the second network device, subsequent to receiving the indication from the third-party service that the second network device has transmitted the packets through a mobile network or a beacon network.

10. The method of claim 9, with the first network device, permit the delivery of content packets to the second network device by sending a certification to a content provider, the content provider being a source of the content packets, the certification indicating that the second network device is a legitimate network device.

11. The method of claim 10, with the first network device, record data associated with the certification in a distributed data structure.

12. The method of claim 9, with the first network device, store the second digital fingerprint in a browser cookie at the second device.

13. The method of claim 9, wherein the second digital fingerprint is a persistent identifier that is maintained on the second device for a threshold period of time.

14. The method of claim 13, wherein the threshold period of time is associated with a time-to-live value and, with the first network device:
  receive packets at a second time period from the second network device;
  query the second network device for the second digital fingerprint;
  identify that the query results in receiving the second digital fingerprint; and
  provide an indication to the second network device that the second network device is a legitimate network device.

15. The method of claim 9, with the first network device, store the persistent identifier at a third network device subsequent to determining that packets received from the third network device identify the unique identifier inserted into the packets at the third network device.

* * * * *